United States Patent
Zhang et al.

(10) Patent No.: US 10,936,506 B2
(45) Date of Patent: Mar. 2, 2021

(54) METHOD FOR TAGGING CONTROL INFORMATION ASSOCIATED WITH A PHYSICAL ADDRESS, PROCESSING SYSTEM AND DEVICE

(71) Applicant: Chengdu Haiguang Integrated Circuit Design Co. Ltd., Chengdu (CN)

(72) Inventors: Chunhui Zhang, Austin, TX (US); Ruchir Dalal, Austin, TX (US); Feng Zeng, Chengdu (CN); Jiang Lin, Austin, TX (US)

(73) Assignee: CHENGDU HAIGUANG INTEGRATED CIRCUIT DESIGN CO., LTD., Sichuan (CN)

( * ) Notice: Subject to any disclaimer, the term of this patent is extended or adjusted under 35 U.S.C. 154(b) by 0 days.

(21) Appl. No.: 16/283,284

(22) Filed: Feb. 22, 2019

(65) Prior Publication Data

US 2020/0272573 A1 Aug. 27, 2020

(51) Int. Cl.
*G06F 12/1009* (2016.01)
*G06F 9/455* (2018.01)
*G06F 12/02* (2006.01)
*G06F 12/14* (2006.01)

(52) U.S. Cl.
CPC ...... *G06F 12/1009* (2013.01); *G06F 9/45558* (2013.01); *G06F 12/0246* (2013.01); *G06F 12/145* (2013.01); *G06F 2009/45583* (2013.01); *G06F 2212/657* (2013.01); *G06F 2212/7201* (2013.01)

(58) Field of Classification Search
CPC .................................................. G06F 12/00–16
See application file for complete search history.

(56) References Cited

U.S. PATENT DOCUMENTS

2012/0137075 A1* 5/2012 Vorbach ............... G06F 12/084
711/122
2018/0181337 A1* 6/2018 Durham ............ G06F 9/30047

\* cited by examiner

*Primary Examiner* — Nicholas J Simonetti
(74) *Attorney, Agent, or Firm* — Barnes & Thornburg LLP; G. Peter Nichols

(57) ABSTRACT

This disclosure provides a method for tagging control information associated with a physical address in a processing system, including setting a hardware tag for the control information, the hardware tag being invisible to a software system in the processing system; joining the hardware tag with the physical address to form a compound physical address, the hardware tag including M bits carried by a dedicated hardware tag control line, the physical address including N bits carried by a physical address bus, M and N being positive integers; and tagging the control information with the hardware tag in the compound physical address.

10 Claims, 5 Drawing Sheets

METHOD FOR TAGGING CONTROL INFORMATION ASSOCIATED WITH A PHYSICAL ADDRESS, PROCESSING SYSTEM AND DEVICE

TECHNICAL FIELD

The present disclosure relates to a hardware tagging method, and more particularly to a method, system and device for tagging control information by using hardware tag in a processing system.

BACKGROUND

In a processing system, after an application is compiled, usually several target programs are formed, and these target programs are used to form loadable programs. Addresses of these programs start from "0", and the other addresses are calculated relative to the starting address. An address range formed by these addresses is called "address space", and the address therein is called "logical address". An address range defined by a series of cells in the memory is called "memory space", and the address therein is called "physical address". In a multi-program environment, it is impossible for each program to be loaded (into the memory) from the "0" address, which causes the logical address in the address space to be inconsistent with the physical address in the memory space. For the programs to run correctly, memory management needs to provide an address mapping function, so as to translate the logical address in the address space into the physical address corresponding thereto in the memory space. This function should be done with hardware support.

Paging storage management is usually adopted to implement translation between the physical address and the logical address. Specifically, the logical address space of one process is divided into multiple equal-sized slices, called pages, accordingly, the memory space is also divided into several storage blocks of the same size as the pages, called (physical) blocks or frames, address translation is achieved through a page table. The current processing system usually adopts a 4-level paging mechanism to implement mapping between the physical address and the logical address. In the 4-level paging mechanism, the physical address and the logical address each include 48 bits.

As computer applications evolve continuously, security management applications for example need some specific tags to tag certain control information, serving as for example unique identifiers for virtual machines (VM) running in the processing system. These specific tags may include one or more bits and act in conjunction with the physical address during running of the programs. Therefore, a method for tagging the aforesaid control information with a tag in a processing system is desired, so that it can be flexibly combined with the physical address without occupying the bits for the physical address.

SUMMARY

According to an aspect of the present disclosure, there is provided a method for tagging control information associated with a physical address in a processing system, comprising: setting a hardware tag for the control information, the hardware tag being invisible to a software system in the processing system; joining the hardware tag with the physical address to form a compound physical address, the hardware tag including M bits carried by a dedicated hardware tag control line, the physical address including N bits carried by a physical address bus, M and N being positive integers; and tagging the control information with the hardware tag in the compound physical address.

According to an embodiment of the present disclosure, wherein the hardware tag and the control information tagged with the hardware tag are in one-to-one correspondence.

According to an embodiment of the present disclosure, wherein the hardware tag is carried by the dedicated hardware tag control line, the physical address is carried by the physical address bus.

According to an embodiment of the present disclosure, wherein the processing system is configured to support control over at least one virtual machine, each of the at least one virtual machine having one unique hardware tag corresponding thereto.

According to an embodiment of the present disclosure, wherein the method for tagging control information associated with a physical address in a processing system further comprises determining the number of the bits included in the hardware tag based on the number of the virtual machine.

According to an embodiment of the present disclosure, wherein the control information is configured as a unique encrypted code of a storage space accessible by one virtual machine of the at least one of virtual machine.

According to an embodiment of the present disclosure, wherein the physical address is a physical address to be accessed by the processing system and/or one virtual machine of the at least one virtual machine.

According to another aspect of the present disclosure, there is further provided a processing system, configured to: send a service request to another processing system; receive a hardware tag allocated by said another processing system, the hardware tag being invisible to a software system in the processing system; join the hardware tag with a physical address to form a compound physical address, the hardware tag including M bits carried by a dedicated hardware tag control line, the physical address including N bits carried by a physical address bus, M and N being positive integers; and access a storage space corresponding to the hardware tag by using the hardware tag in the compound physical address.

According to another aspect of the present disclosure, there is further provided a processing system, configured to: receive a service request from another processing system; set a unique hardware tag corresponding to said another processing system, the hardware tag being invisible to a software system in the processing system; and tag control information with the hardware tag, the control information being configured as a unique encrypted code of a storage space accessible by said another processing system.

According to another aspect of the present disclosure, there is further provided a processing device, comprising: one or more processors; and one or more memories, wherein the memory stores computer-readable codes that cause, when executed by the one or more processors, the method for tagging control information associated with a physical address in a processing system as described above to be executed.

BRIEF DESCRIPTION OF THE DRAWINGS

In order to more clearly explain the technical solutions in the embodiments of the present disclosure or in the prior art, drawings necessary for describing the embodiments of the present disclosure or in the prior art will be briefly introduced below, obviously, the following described drawings are merely some embodiments of the present disclosure, for those of ordinary skill in the art, it is possible to attain other drawings based on these drawings without paying inventive efforts.

FIG. 1 shows a schematic diagram of security management with Multi-Key Total Memory Encryption (MKTME).

DETAILED DESCRIPTION OF THE EMBODIMENTS

Figure 1:
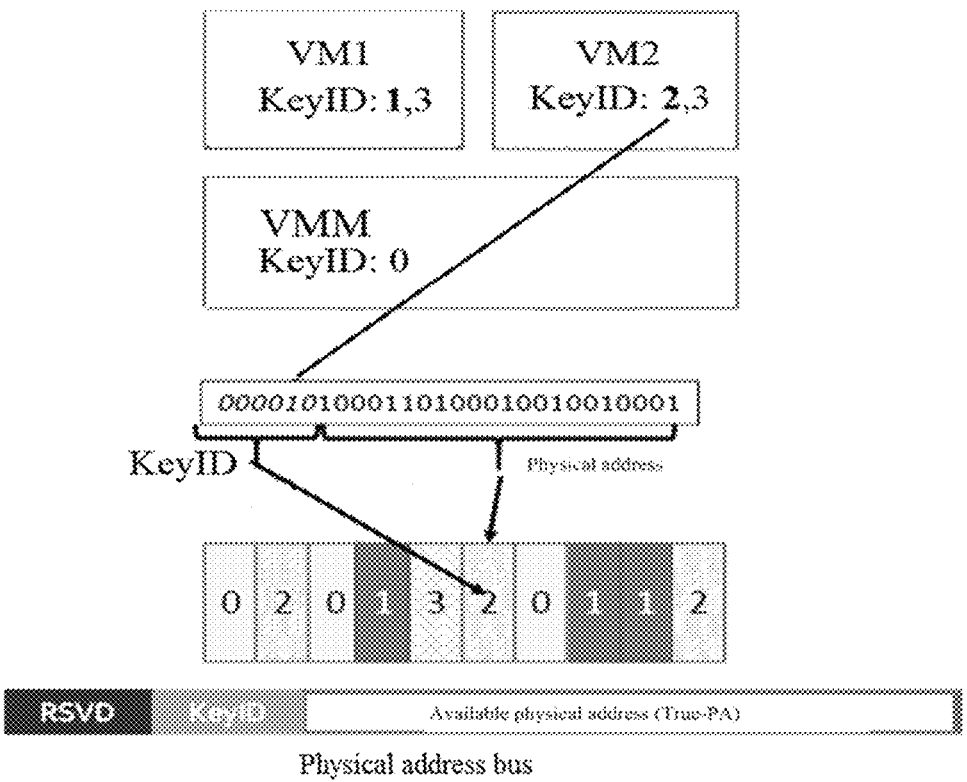

Hereinafter, the technical solutions in the embodiments of the present disclosure will be described clearly and comprehensively in combination with the drawings in the embodiments of the present disclosure, obviously, these described embodiments are parts of the embodiments of the present disclosure, rather than all of the embodiments thereof. All the other embodiments obtained by those of ordinary skill in the art based on the embodiments of the present disclosure without paying creative efforts fall into the protection scope of the present disclosure.

Words and expressions such as "first", "second" and the like used in the specification and claims of the present disclosure do not denote any sequence, quantity or priority, but used to distinguish different components. Likewise, words such as "include", "comprise" and the like refer to that an element or an object before this word contains all the elements or objects listed thereinafter or alternatives thereof, without excluding other elements or objects. Words such as "connected", "connecting" and the like are not restricted to physical or mechanical connections, but may include electrical connections, regardless of direct or indirect connections.

The flowchart is used in the present application to illustrate steps of the method according to an embodiment of the present application. It should be understood that the preceding or following steps may not be necessarily performed precisely in order. Instead, the respective steps may be processed in reverse order or simultaneously. At the same time, other operations may be added to these processes, or one or several steps may be removed from these processes.

As computer applications are continuously developing, computer programs and instruction systems could get various attacks, such as unauthorized access, and may be at risk of significant data leak. For example, unauthorized visitors may steal or falsify a legitimate identity to enter a computer system and privately extract important data from the computer or destroy the data or the computer system, causing important data to leak or the computer system to crash. Usually a software security management mechanism is added to prevent unauthorized visitors from entering the computer system with a falsified authorized identity, for example, users who are authorized (i.e., considered to be secure) can be allocated an identity, an access password is added, or access right is allocated to the user to allow access to only part of the data, thereby enhancing security of the computer system by managing the users. In addition, sensitive data can be encrypted to ensure data security, so that visitors without an encryption key cannot read the data.

In addition, with the development of new technologies such as cloud computing and cloud storage, the computer security computing environment is more vulnerable to threats, users can access the data center through computers and mobile phones, and visit the network according to their needs to have access to configurable computing resources (e.g., resources may include networks, servers, storage, application software, services, etc.). Privacy information and sensitive data of the users using cloud computing may be collected by cloud technologies, and security issues such as unauthorized data access may also exist between users that have access to cloud computing.

Although data is usually encrypted when stored on disk, it is still stored in DRAM, which makes it vulnerable to snooping from unauthorized administrators, software, or hardware probe, thus confidential data may be revealed. The new non-volatile memory technology (NVDIMM) exacerbates this problem because the NVDIMM chip can be completely removed from the system, similar to a hard disk. Any stored information (such as sensitive data, passwords, or keys) can be easily affected if it is not encrypted.

In order to ensure security of the memory space, a Total Memory Encryption (TME) scheme has been proposed, which is used to achieve the function of encrypting the overall physical memory of the system. Once configured and locked, the TME can encrypt all data on the Security Operations Center (SOC) with algorithms using 128-bit encryption keys. The aforesaid encryption keys are generated by a key generator on the SOC and are inaccessible to software or an external interface, thereby protection of the external memory bus is achieved.

Multi-Key Total Memory Encryption (MKTME) is built based on the TME technology, and it adds support for multiple encryption keys. The SOC can support a fixed number of encryption keys, and the software can configure the SOC to use the available encryption keys, thereby encrypting any page of the memory using each available encryption key. Therefore, the MKTME allows page refined encryption of the memory. The MKTME can also work together with multiple virtualization schemes, for example, individual virtual machines on the system are allowed to have their own private storage space.

Specifically, the aforesaid MKTME is implemented by redefining certain bits on the physical address bus. FIG. 1 shows a schematic diagram of security management with MKTME. As shown in FIG. 1, some bits on the physical address bus are used as the key identifier KeyID, i.e. some bits on the physical address bus are redefined as the key identifier KeyID, so that the key identifier KeyID can communicate with an encryption engine in the memory controller. For example, the key identifier KeyID 0 can generally be used for a hypervisor VMM, as for two virtual machines VM1 and VM2 running thereon, their own key identifiers KeyID 1 and KeyID 2 can be used, respectively. VM 1 can access the VM1 private page through the key identifier KeyID 1, and VM2 can access the VM2 private page through the key identifier KeyID 2. In addition, VM1 and VM2 can also access the storage space shared by VM1 and VM2 through the shared key identifier KeyID 3. As for the hypervisor VMM, it can access the VMM private page through the key identifier KeyID 0. The aforesaid key identifier KeyID used to identify the storage space is carried on a part of the bits of the physical address bus, and the remaining bits on the physical address bus are used to carry the address corresponding to the storage space. In other words, the key identifier KeyID is carried by redefining certain bits on the physical address bus, that is, the physical address bus carries not only the address corresponding to the storage space but also encryption key information of the storage space. Accordingly, secure storage management of the virtual machine is realized.

In addition, a Secure Memory Encryption (SME) scheme is further proposed, to ensure that stored data will not be hacked. The SME defines a simple and efficient architectural function for main memory encryption. Although memory encryption technology has been used in a variety of specialized products and industries, the SME is a flexible, universal mechanism that can be integrated into the CPU architecture, scaling from embedded servers to high-end server workloads, without the need to modify application software.

Secure Encrypted Virtualization (SEV) integrates the main memory encryption and the virtualization architecture on the basis of SME to implement and support encryption management for virtual machines. By allocating each virtual machine its unique virtual machine identifier ASID, the virtual machine can be protected from some physical attacks, and the isolation between virtual machines can be also achieved. In addition, the virtual machine can be isolated from the hypervisor, that is, any computer that does not have the virtual machine identifier ASID has no right to access the data or storage area corresponding to the virtual machine identifier ASID. Therefore, the SEV represents a new virtualization security management mode, which can be applied to cloud computing in particular, implement encryption management between a virtual machine and other virtual machines as well as the hypervisor to ensure data security of each virtual machine.

Figure 2:
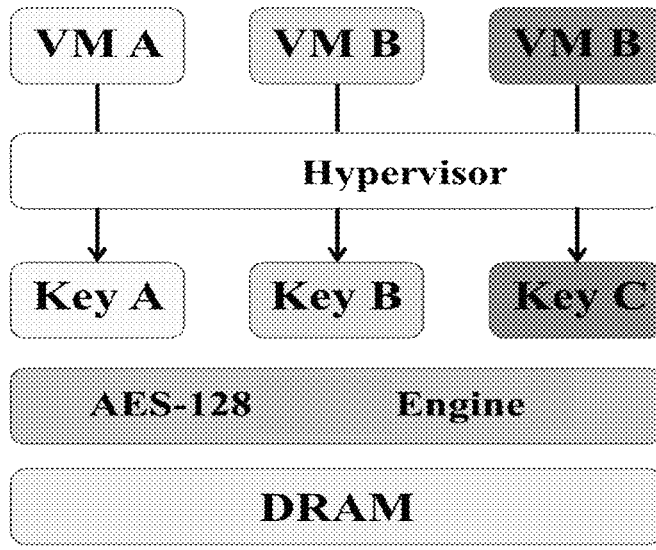
FIG. 2 shows a schematic diagram of security management with Security Encrypted Virtualization (SEV)

Specifically, as shown in FIG. 2, under the control of a hypervisor, running of multiple virtual machines (e.g., VM A, VM B, VM C, etc.) can be supported. When enabled, SEV hardware will tag all codes and data with the virtual machine identifier ASID, the virtual machine identifier ASID indicates these data or codes are from which virtual machine or for which virtual machine. Within the SOC, this flag will always exist and whoever other than the virtual machine corresponding to the virtual machine identifier ASID is blocked from accessing or using these data tagged with the ASID. Outside the SOC, when data leaves or enters the SOC, the encryption key associated with the virtual machine identifier ASID will be used to encrypt or decrypt the data. Thus, each virtual machine is associated with the encryption key through its own unique virtual machine identifier ASID, for example, the virtual machine VM A with the virtual machine identifier ASID A can access the data encrypted by the Key A through the virtual machine identifier ASID A, the Key A and the virtual machine identifier ASID A are in one-to-one correspondence. Any other virtual machines that do not have the virtual machine identifier ASID A and the hypervisor will not have access to the data encrypted by the Key A. It can be known that, in SEV, the encryption key Key can be used as control information for data access, and the control information is associated with the virtual machine identifier ASID, that is, the virtual machine obtains, through the ASID that it has, the access right for the storage space encrypted by the Key associated with the ASID.

The SEV allocates a unique virtual machine identifier ASID to each virtual machine and establishes an isolation layer between the hypervisor and the virtual machine VM. The aforesaid identifier ASID is implemented by redefining certain bits on the physical address bus. For example, for secure application management that supports 16 virtual machines, the ASID needs to occupy 4 bits on the physical address bus to achieve unique identification for each virtual machine.

It can be seen that in the above security management schemes such as MKTME and SEV, the M (e.g., 5) bits redefined on the physical address bus are used as the identifier of the virtual machine or the storage space, the virtual machine can be isolated from the accessible storage space through the identifier, so that other virtual machines that do not have the identifier cannot make access, thereby the aim of secure storage encryption is achieved.

Figure 3A:
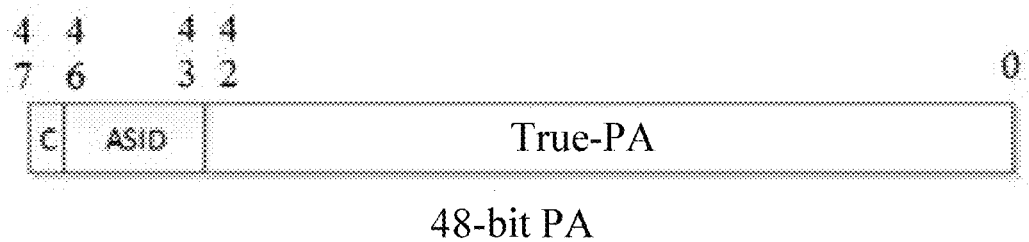
FIG. 3A shows a schematic diagram of a physical address bus in the SEV supporting 16 virtual machines.

However, the above-described implementation of redefining the M bits on the physical address bus inevitably reduces the original bits for the true physical address on the physical address bus. For example, in SEV, for the security management function that supports 16 virtual machines, a total of 5 bits are occupied on the physical address bus, one bit is used to identify whether the virtual machine needs to be encrypted, and the remaining 4 bits are used for the virtual machine identifier ASID. That is, on the physical address bus having 48 bits, only the remaining 43 bits are used for the true physical address PA (true-PA), for example, 0-42 bits as shown in FIG. 3A. Thus, the storage space represented by the physical address is reduced down to $\frac{1}{32}$ of the original (the true-PA is reduced from the original 48 bits down to 43 bits) because SEV occupies 5 bits.

Figure 3B:
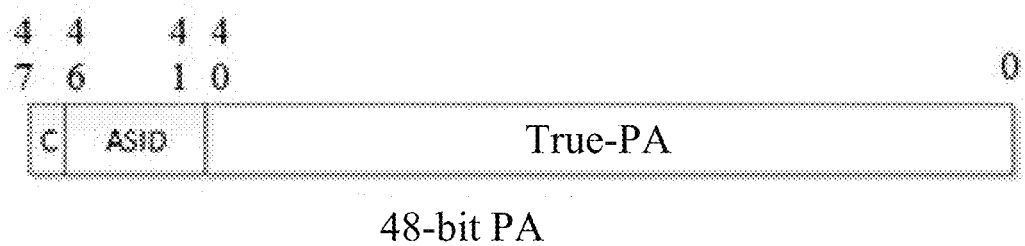
FIG. 3B shows a schematic diagram of a physical address bus in the SEV supporting 64 virtual machines.

In addition, if it is desired to use the SEV to manage more virtual machines, for example, supporting encryption management of 64 virtual machines, the ASID needs to occupy 6 bits on the physical address bus, that is, 64 ASID identifiers are set as a unique identifier for each virtual machine. This means that the number of the bits for the true physical address on the physical address bus will be reduced down to, for example, 41 bits, such as 0-40 bits as shown in FIG. 3B.

Figure 4:
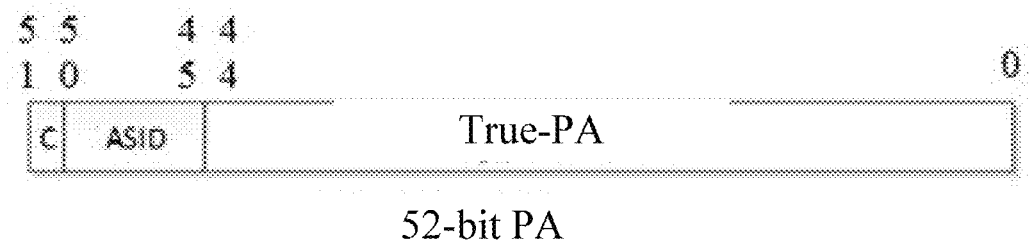
FIG. 4 shows another schematic diagram of a physical address bus in the SEV supporting 64 virtual machines.

In order to achieve security management for multiple (e.g., 64) virtual machines as described above, and at the same time ensure a sufficient number of bits for the true physical address PA, implementation may be made by increasing the number of the bits on the physical address bus. For example, a physical address bus with 52 bits can be used. In this way, as shown in FIG. 4, in the case of supporting 64 virtual machines, except 7 bits (one C bit and 6 bits for the ASID) redefined for security management, 45 bits used for true physical addresses can be reserved.

The above mode of increasing the number of the bits on the physical address bus can achieve the aim of reserving a relatively large number of bits for the true physical address to some extend in the case of supporting more virtual machines. However, using a physical address bus with 52 bits means that 5-level paging is required to implement mapping between the physical address and the linear address (logical address). 5-level paging translates linear addresses by traversing a 5-level hierarchy of paging structures, which extends the processor's linear-address width to 57 bits. Compared to 4-level paging, 5-level paging means more complex mapping management relationships and faces more cost and risk issues.

In addition, even if a more complex 5-level paging architecture is used to avoid occupation of the bits for the true physical address by the redefined bits in the SEV supporting 64 virtual machines, as the application requirements increase, in the case where more virtual machines need to be supported, the virtual machine identifier ASID used to identify the virtual machine will increasingly occupy more and more bits of the physical address bus. For example, when it needs to support the security management of 128 virtual machines, it means that 8 bits need to be redefined on the physical address bus, and so on, and so forth. This means that the way to securely manage virtual machines by redefining the bits on the physical address bus limits the scalability of the virtual machine's security management application. In other words, on the basis of guaranteeing a sufficient number of bits for the true physical addresses, the number of the virtual machines that can be supported is limited.

Thus, the above-described manner of redefining M bits on the physical address bus to carry the security management identifier (e.g., virtual machine identifier ASID or key identifier KeyID) has inevitable limitations. Therefore, it is desirable to have a tagging method that can support the security management of multiple virtual machines and will not occupy the bits of physical address bus.

Figure 5:
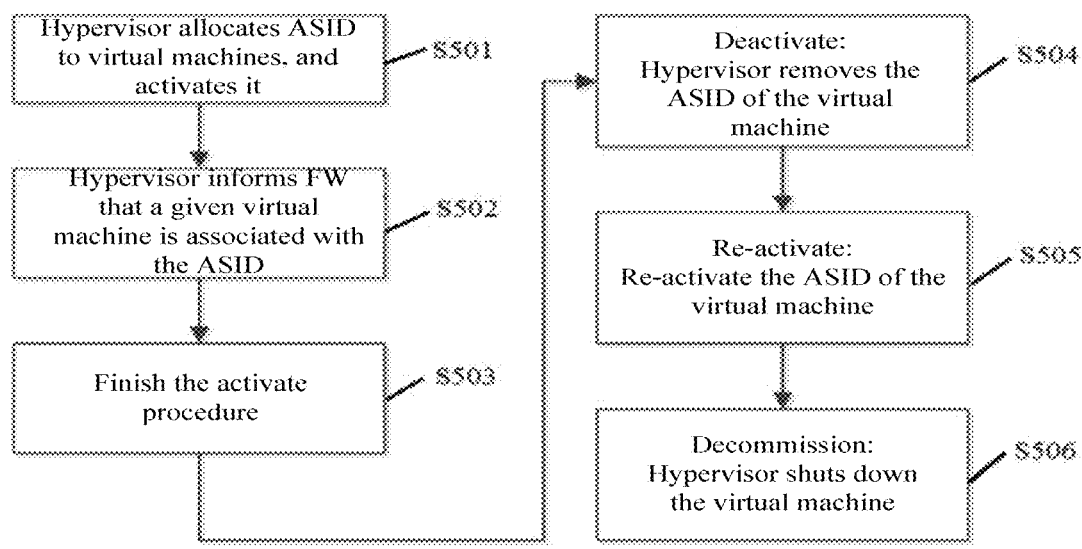
FIG. 5 shows a schematic diagram illustrating an operation cycle of the identifier ASID.

FIG. 5 shows an operation cycle of the above-described virtual machine identifier ASID in the SEV, next, the operation cycle of the ASID will be analyzed in detail with reference to FIG. 5. First, in step S501, the hypervisor allocates each virtual machine a unique identifier ASID, for example, allocating the virtual machine identifier ASID 1 to the virtual machine 1. The ASID 1 is carried by the redefined M bits on the virtual machine's physical address bus. For example, for a physical address bus with 48 bits, in the case of supporting 16 virtual machines, the virtual machine identifier ASID 1 occupies the 43th-46th bits on the physical address bus, denoted as 0001. The hypervisor can activate the virtual machine 1 to which the virtual machine identifier ASID 1 is allocated.

Next, in step S502, the hypervisor issues a notification to firmware FW of the SOC, the virtual machine 1 is associated with the virtual machine identifier ASID 1, the SOC allocates an encryption key Key 1 to the virtual machine 1. Thereafter, the FW establishes the association between Key 1 and ASID 1 for the virtual machine 1, and implements encryption process using the encryption key Key 1 associated with the virtual machine identifier ASID 1. Thereby, the virtual machine 1 having the ASID 1 can obtain the Key 1 corresponding to the ASID 1 through the unique virtual machine identifier ASID 1, and the virtual machine 1 can access the data through the Key 1, other virtual machines or administrators that do not have the virtual machine identifier ASID 1 cannot access the storage space encrypted by the Key 1, thereby achieving isolation between virtual machines themselves and isolation between virtual machines and administrators, so as to ensure data security. In other embodiments according to the present disclosure, the association between ASID 1 and the corresponding virtual machine may also be implemented in other manners based on a particular implementation.

Thereafter, in step S503, the FW completes an activation procedure associated with the virtual machine. Thus, the SOC can identify the virtual machine, so that the virtual machine can utilize its virtual machine identifier ASID to achieve access to the storage space.

Then, if it needs to temporarily cancel operation right of the virtual machine 1, a deactivation process may be executed in step S504, that is, the virtual machine identifier ASID 1 of the virtual machine 1 is temporarily canceled, and the FW removes association between the Key 1 and the ASID 1.

When the virtual machine 1 can continue to run, the step of re-activation processing can be implemented in step S505. Thus, the virtual machine 1 can use its virtual machine identifier ASID 1 to access the storage space.

Last, in step S506, in the case where the virtual machine 1 no longer needs to continue to run, the hypervisor can shut down the virtual machine 1, the FW deletes the Key 1 and other internal states for the virtual machine 1, thereby implementing the virtual machine's release procedure.

Thus, the system does not need to pre-allocate the virtual machine identifier ASID on the physical address bus. In other words, during virtual machine security management, the virtual machine identifier ASID is required only at the page walk time.

On this basis, the present disclosure provides a method for tagging control information associated with a physical address in a processing system. In the processing system, when the control information associated with the physical address/storage space (e.g., the virtual machine identifier ASID/key identifier KeyID for security management) needs to be tagged, it may be achieved by adopting a hardware tag manner, instead of redefining the M bits on the physical address bus, to avoid the adverse effects due to the redefined M bits as described above.

Figure 6:
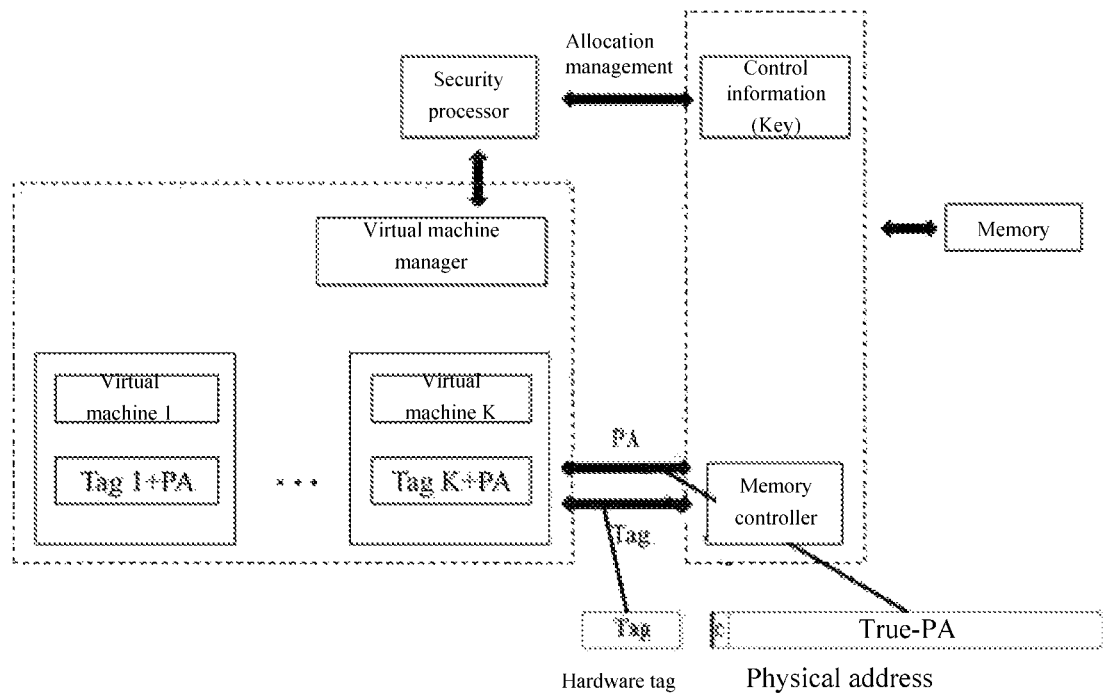
FIG. 6 shows a schematic diagram of a security management system according to an embodiment of the present disclosure.

In an embodiment according to the present disclosure, the processing system may be configured to implement control over multiple virtual machines, for example, the processing system is a security management system supporting K virtual machines. The security management system may allocate one unique hardware tag to each virtual machine among the K virtual machines. FIG. 6 shows a schematic diagram of a security management system according to an embodiment of the present disclosure.

As shown in FIG. 6, before the virtual machine runs, the security management system allocates a hardware tag Tag to the virtual machine as a virtual machine identifier, for example, assigning a hardware tag Tag 1 to the virtual machine 1, and the Tag 1 can be implemented as a hardware tag, carried by a dedicated hardware tag control line, and the hardware tag Tag 1 is joined with the physical address PA of the virtual machine 1 carried by the physical address bus to form a compound physical address that may be represented as Tag 1+PA.

In the method according to the present disclosure, the number of the bits included in the hardware tag may be determined based on the number of the virtual machines. For example, in the case where K is 16, the hardware tag may include 4 bits to implement a unique identification for the 16 virtual machines. Similarly, in the case where K is 64, the hardware tag may include 6 bits.

In an embodiment according to the present disclosure, the control information may be configured as a unique encrypted code of a storage space accessible by one of the K virtual machines, for example, an encryption key Key. A security manager can encrypt some of the storage space in the memory using the encryption key Key as an encryption key. The security manager can also manage the encryption key Key. The hardware tag Tag and the control information tagged with the hardware tag Tag is in one-to-one correspondence.

For example, the hardware tag Tag 1 may be associated with the encryption key Key 1, and the virtual machine 1 having the hardware tag Tag 1 may obtain the encryption key Key 1 using the Tag 1 and access the storage space encrypted by the encryption key Key 1, thus realizing the security management of the storage space private to the virtual machine 1.

As shown in FIG. 6, the virtual machine has a compound physical address composed of the hardware tag Tag and the physical address PA, for example, the virtual machine 1 has a Tag 1+PA. Herein, the hardware tag is carried by a dedicated hardware tag control line, and the physical address is carried by the physical address bus.

During the virtual machine security management process, when the virtual machine 1 needs to access the storage space, the hardware tag Tag 1 carried by the dedicated control line and the physical address carried by the physical address bus are transmitted through different lines. The virtual machine obtains the encryption key Key 1 associated with Tag 1 and implements access to the corresponding storage space. Different from the above manner of redefining a certain number of bits on the physical address bus to carry the virtual machine identifier, the hardware tag carried by the dedicated control line does not occupy the bits on the physical address bus, that is, the number of bits for the true physical addresses is not reduced, thus achieving scalability of virtual machine security management. In other words, when the number of virtual machines that the security management system needs to support increases, for example, when expanding from 16 virtual machines to 64 virtual machines, only the number of bits of the hardware tag needs to be increased (from 4 bits to 5 bits), identification of the 64 virtual machines can be achieved without occupying bits on the physical address bus.

According to other embodiments of the present disclosure, the control information may also be a certain type of specific information, for example, the specific information may implement a function similar to the KeyID.

Figure 7:
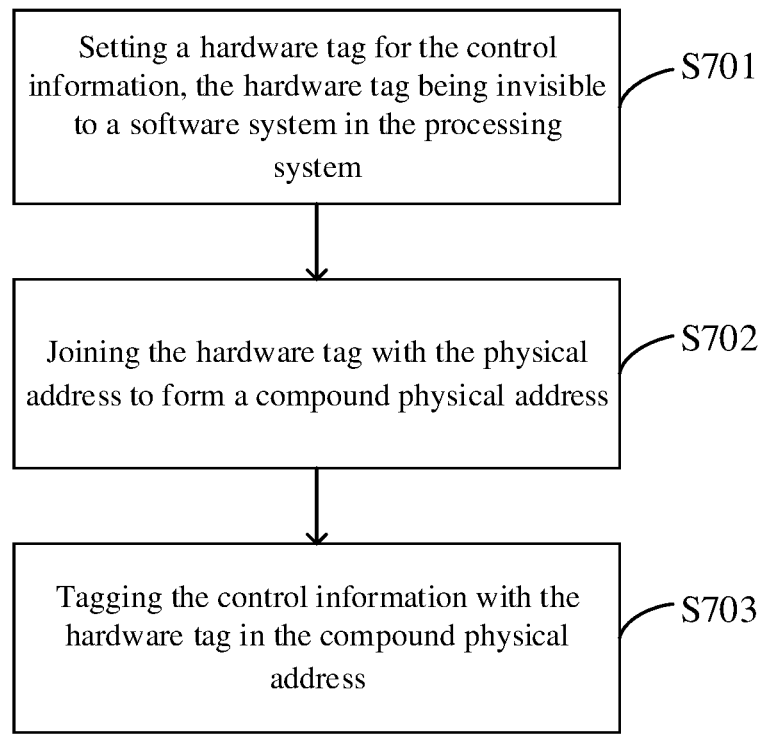
FIG. 7 shows a flow chart of a method for tagging control information with a hardware tag according to an embodiment of the present disclosure.

FIG. 7 shows a flow chart of a method for tagging control information with a hardware tag according to an embodiment of the present disclosure.

As shown in FIG. 7, the above method according to an embodiment of the present disclosure may include the following steps. First, in step S701, a hardware tag for control information is set. According to an embodiment of the present disclosure, the hardware tag is invisible to a software system in the processing system, instead it is information directly read by the hardware circuit, and the hardware circuit performs control operations directly according to the read information. For example, the hardware tag Tag 1 for representing the virtual machine identifier ASID 1 may be set. The Tag 1 is invisible to the software system during a run cycle of the Tag1. That is, neither the hypervisor nor the software system of the remaining virtual machines can read the hardware tag Tag 1, and cannot learn the control information carried by the hardware tag Tag 1. In other words, the function of the virtual machine identifier ASID 1 can be implemented using the hardware tag Tag 1. The hardware tag (for example Tag 1) according to the present disclosure does not occupy bits on the physical address bus compared to the ASID 1 redefined on the physical address bus, that is, do not occupy physical address bus resources, and do not affect the operation of the software system. For example, once the hardware tag Tag 1 is allocated to the virtual machine 1, only the virtual machine 1 can learn the hardware tag Tag 1, and the remaining virtual machines may not learn the hardware tag Tag 1, and the software system in an addressing operation cannot read the identity information of the virtual machine in the address space to be addressed, thereby security of the address space management is improved.

Figure 8:
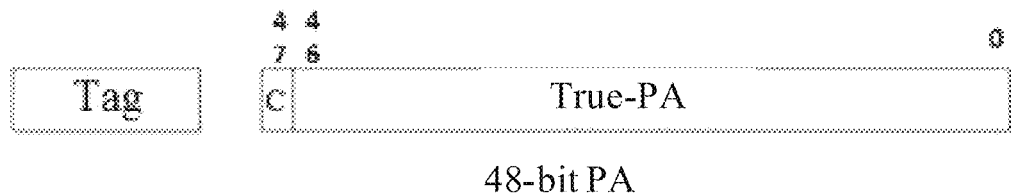
FIG. 8 shows a schematic diagram of a hardware tag according to an embodiment of the present disclosure.

Next, in step S702, the hardware tag is joined with the physical address to form a compound physical address (Compound-PA), wherein the hardware tag includes M bits carried by a dedicated hardware tag control line, the physical address includes N bits carried by a physical address bus, where M and N are positive integers. For example, in an embodiment of secure virtual machine management, as shown in FIG. 8, in the case of a 48-bit physical address bus, when the system needs to support management for 16 virtual machines, the M bits may be 4 bits, used to represent the identifier ASID. The N is 48, and the redefined C bit needs to be reserved on the physical address bus, and the remaining 0-46 bits are used for the true physical address. The compound physical address is a combination of the hardware tag Tag carried by the dedicated hardware tag control line and the physical address of 48 bits carried by the physical address bus.

Compared with the redefined ASID in the physical address bus, in the compound physical address, the hardware tag Tag maintains an association relationship with the physical address and does not occupy bits on the physical address bus. That is, in virtualization security management, bits on the physical address bus are not occupied due to an increase in the number of the supported virtual machines. In this way, the number of virtual machines supported in the system is scalable, and the number of supported virtual machines can be increased according to actual application requirements without affecting the number of available physical addresses. In addition, identification of the virtual machine is achieved by employing hardware tags instead of redefining the M bits on the physical address bus, thereby avoiding the risk of implementing a complex 5-level paging architecture.

Next, in step S703, the control information is determined according to the hardware tag in the compound physical address. For example, in an embodiment of secure virtual machine management, the hardware tag is represented as Tag, and the control information is an encryption key Key associated with the Tag, that is, the hardware tag is used to determine the control information, and the control information is determined according to the hardware tag. A virtual machine having a hardware tag Tag implemented as a hardware tag can access a storage space encrypted with the Key. In addition, it should be noted that implementing the function of the identifier ASID by using the hardware tag Tag is merely exemplary. In other embodiments according to the present disclosure, hardware tag may also be utilized to represent other information, for example, KeyID or other specific information etc. The control information may also be other information used for system management, and the information tagged with the hardware tag may achieve a desired control function.

In an embodiment according to the present disclosure, the physical address may be not only a physical address to be accessed by multiple virtual machines, but also a physical address to be accessed by the processing system. That is, the system that serves as the hypervisor of the virtual machine may also be allocated a hardware tag uniquely corresponding thereto, for example, Tag 0, and the compound physical address Tag 0+PA is formed by joining the hardware tag Tag 0 with the physical address of the system. Therefore, the hypervisor including the hardware tag Tag 0 can access the storage space encrypted by Key 0 associated with Tag 0, but does not have the right to access the storage space of other virtual machines, and other virtual machines cannot access the storage space of the management system either, therefore, the management system can store sensitive data such as management information in a storage space encrypted by Key 0, and avoid unauthorized access by other virtual machines to the sensitive data. This further ensures data security, which not only isolates virtual machines from each other, but also blocks insecure access between the hypervisors and the virtual machine users.

Figure 9:
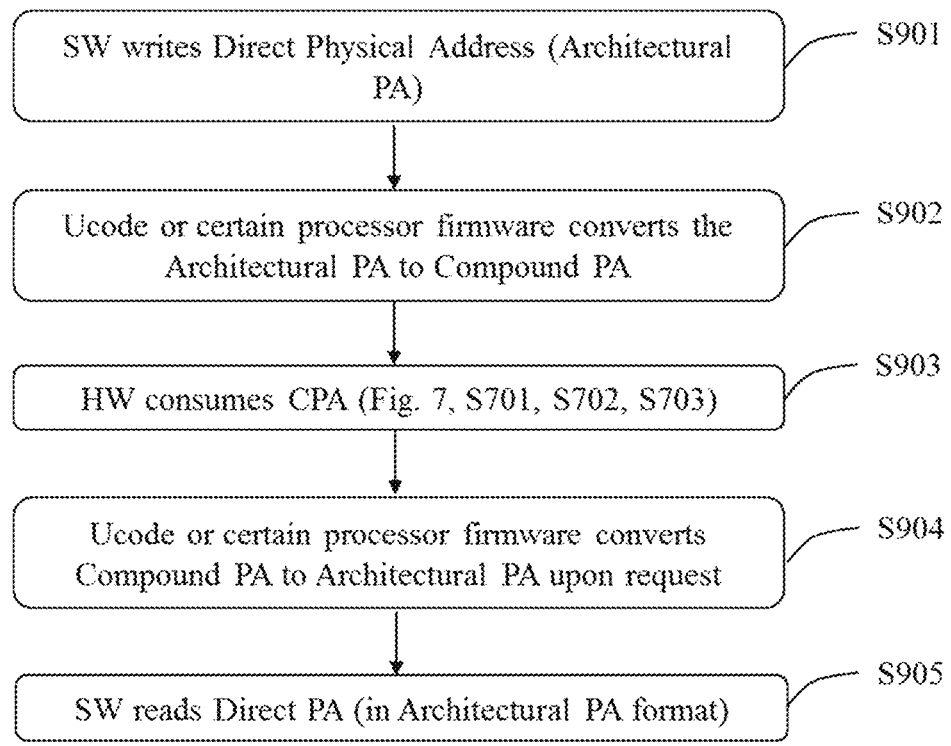
FIG. 9 shows a flow chart of a method for tagging control information with a hardware tag due to direct physical address accesses according to an embodiment of the present disclosure.

FIG. 9 shows a flow chart of a method for tagging control information with a hardware tag due to direct physical address accesses according to an embodiment of the present disclosure.

As shown in FIG. 9, the above method according to an embodiment of the present disclosure may include the following steps. First, in step S901, software (SW) can conduct direct physical address accesses in scenarios such as virtualization or silicon debugging. Next, in step S902, ucode or certain processor firmware will convert the direct physical address, or the architectural physical address, to the compound physical address (CPA) in such scenarios. The compound physical address is consumed as internal physical address in the hardware (HW), shown in step S903. If software tries to read the direct physical address, ucode or certain firmware will convert the compound physical address back to the architectural physical address, thus software will see the physical address in its architectural form, shown in steps S904 and S905.

In the method according to the present disclosure, the hardware tag and the control information tagged with the hardware tag are in one-to-one correspondence. For example, the hardware tag Tag 1 has a one-to-one correspondence with the encryption key Key 1 for encrypting the storage space, and according to the hardware tag Tag 1, a unique encryption key Key 1 corresponding thereto can be found, so that only the virtual machine of the hardware tag Tag 1 can access the space encrypted by the encryption key Key 1, so as to ensure data security.

In the method according to the present disclosure, since the dedicated hardware tag is used to implement the identifier and form the compound physical address, the hardware information in the compound physical address is used to tag the control information, thereby scalability of the supported virtual machine is increased, occupation of bits on the physical address bus by the identifier is avoided and a complex 5-level paging architecture is not required.

According to another embodiment of the present disclosure, there is also provided a processing system, the processing system is configured to: send a service request to another processing system; receive a hardware tag allocated by said another processing system, the hardware tag being invisible to a software system in the processing system; join the hardware tag with a physical address to form a compound physical address, the hardware tag including M bits carried by a dedicated hardware tag control line, the physical address including N bits carried by a physical address bus, M and N being positive integers; and access a storage space corresponding to the hardware tag by using the hardware tag in the compound physical address. For example, the processing system may be implemented as a virtual machine as described above, a compound physical address of the virtual machine is formed by combining the allocated hardware tag, and achieve an access function to the storage space corresponding thereto. The said another processing system may be implemented as a hypervisor system for managing virtual machines as described above. The specific process of the implementation is similar to the method described above in connection with FIG. 6 and FIG. 7, and details are not described herein again.

According to still another embodiment of the present disclosure, there is also provided a processing system, the processing system is configured to: receive a service request from another processing system; set a unique hardware tag corresponding to said another processing system, the hardware tag being invisible to a software system in the processing system; and tag control information with the hardware tag, the control information being configured as a unique encrypted code of a storage space accessible by said another processing system. For example, the processing system may be implemented as a hypervisor system for managing virtual machines as described above. The said another processing system may be implemented as a virtual machine as described above. The specific process of the implementation is similar to the method described above in connection with FIG. 6 and FIG. 7, and details are not described herein again.

According to still another embodiment of the present disclosure, there is also provided a processing device, the processing device comprises: one or more processors; and one or more memories, wherein the memory stores computer-readable codes that cause, when executed by the one or more processors, any of the method described above to be executed.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

What is claimed is:

1. A method for tagging control information associated with a physical address in a processing system, comprising:
    setting a hardware tag for the control information, the hardware tag being invisible to a software system in the processing system;
    joining the hardware tag with the physical address to form a compound physical address, the hardware tag including M bits carried by a dedicated hardware tag control line, the physical address including N bits carried by a physical address bus, M and N being positive integers, wherein the hardware tag does not occupy the physical address bus; and
    tagging the control information with the hardware tag in the compound physical address.

2. The method of claim 1, wherein the hardware tag and the control information tagged with the hardware tag are in one-to-one correspondence.

3. The method of claim 1, wherein the hardware tag is carried by the dedicated hardware tag control line, the physical address is carried by the physical address bus.

4. The method of claim 1, wherein the processing system is configured to support control over at least one virtual machine, each of the at least one virtual machine having one unique hardware tag corresponding thereto.

5. The method of claim 4, further comprising determining the number of the bits included in the hardware tag based on the number of the virtual machine.

6. The method of claim 4, wherein the control information is configured as a unique encryption key of a storage space accessible by one of the at least one virtual machine.

7. The method of claim 4, wherein the physical address is a physical address to be accessed by the processing system and/or one virtual machine of the at least one virtual machine.

8. A processing device, comprising one or more processors and one or more memories, wherein the memory stores computer-readable codes that cause, when executed by the one or more processors, the method of claim 1 to be executed.

9. A processing system, configured to:
send a service request to another processing system;
receive a hardware tag allocated by said another processing system, the hardware tag being invisible to a software system in the processing system;
join the hardware tag with a physical address to form a compound physical address, the hardware tag including M bits carried by a dedicated hardware tag control line, the physical address including N bits carried by a physical address bus, M and N being positive integers, wherein the hardware tag does not occupy the physical address bus; and
access a storage space corresponding to the hardware tag by using the hardware tag in the compound physical address.

10. A processing system, configured to:

receive a service request from another processing system;

set a unique hardware tag corresponding to said another processing system, the hardware tag being invisible to a software system in the processing system; and tag control information with the hardware tag, the control information being configured as a unique encryption key of a storage space accessible by said another processing system, wherein the tag control information with the hardware tag joins the hardware tag with a physical address to form a compound physical address, the hardware tag including M bits carried by a dedicated hardware tag control line, the physical address including N bits carried by a physical address bus, M and N being positive integers, wherein the hardware tag does not occupy the physical address bus.

\* \* \* \* \*